(12) United States Patent
Matsumoto et al.

(10) Patent No.: US 7,492,431 B2
(45) Date of Patent: Feb. 17, 2009

(54) ACTIVE MATRIX LIQUID CRYSTAL DISPLAY HAVING A THIN FILM TRANSISTOR OVER WHICH ALIGNMENT OF LIQUID CRYSTAL MOLECULES DOES NOT CHANGE

(75) Inventors: Kimikazu Matsumoto, Tokyo (JP); Shinichi Nishida, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 539 days.

(21) Appl. No.: 11/291,997

(22) Filed: Dec. 2, 2005

(65) Prior Publication Data

US 2006/0082713 A1  Apr. 20, 2006

Related U.S. Application Data

(62) Division of application No. 10/656,138, filed on Sep. 8, 2003, now Pat. No. 7,009,673.

(30) Foreign Application Priority Data

Jul. 17, 2000 (JP) ............... 2000-216202

(51) Int. Cl.
*G02F 1/136* (2006.01)
*G02F 1/1343* (2006.01)

(52) U.S. Cl. ............... 349/146; 349/43; 349/141; 345/92; 345/93

(58) Field of Classification Search ............ 349/43, 349/141, 146; 345/92, 93
See application file for complete search history.

(56) References Cited

U.S. PATENT DOCUMENTS

| 4,345,249 | A | 8/1982 | Togashi |
| 6,088,078 | A | 7/2000 | Kim et al. |
| 6,111,627 | A | 8/2000 | Kim et al. |
| 6,259,503 | B1 | 7/2001 | Watanabe et al. |
| 6,469,765 | B1 * | 10/2002 | Matsuyama et al. ......... 349/143 |
| 6,667,077 | B1 | 12/2003 | Oaku et al. |
| 6,682,783 | B1 | 1/2004 | Tomioka et al. |
| 6,704,085 | B2 | 3/2004 | Nishimura et al. |
| 2008/0100555 | A1 * | 5/2008 | Yoon et al. ............ 345/92 |
| 2008/0204613 | A1 * | 8/2008 | Kim et al. ............ 349/33 |

FOREIGN PATENT DOCUMENTS

| JP | 10-228016 | 8/1998 |
| JP | 11-160731 | 6/1999 |
| JP | 11-202323 | 7/1999 |
| JP | 2000-10107 | 1/2000 |
| JP | 2000-66222 | 3/2000 |

* cited by examiner

*Primary Examiner*—Julie Ngo
(74) *Attorney, Agent, or Firm*—Young & Thompson

(57) ABSTRACT

In an active matrix liquid crystal display device, a drain and source of a TFT element for controlling power supply to a pixel electrode, are arranged so that an alignment direction of liquid crystal molecules over the source and drain does not change, thereby preventing formation of ghost images in the display. In one embodiment, an electric field generated between the source and drain is parallel to an initial non-zero alignment angle of the molecules.

1 Claim, 12 Drawing Sheets

ACTIVE MATRIX LIQUID CRYSTAL DISPLAY HAVING A THIN FILM TRANSISTOR OVER WHICH ALIGNMENT OF LIQUID CRYSTAL MOLECULES DOES NOT CHANGE

BACKGROUND OF THE INVENTION

1. Field of the Invention

The present invention relates to an active matrix liquid crystal display device and, more particularly, to an active matrix liquid crystal display device in which the residual image phenomenon is prevented.

2. Description of the Prior Art

A liquid crystal display device is adopted in many fields such as a viewfinder for a video camera, a pocket TV, a high-resolution projection TV, a personal computer, and the like. In particular, an active matrix liquid crystal display device using a thin-film-transistor (TFT) as a switching element has a major feature that it can maintain a high contrast even when it performs high-capacity display, and accordingly it has been developed and commercialized actively.

The above active matrix liquid crystal display device widely employs the TN (Twisted-Nematic)-method NW (Normally-white) mode as the liquid crystal display mode. According to the TN method, a panel, which is formed of electrode substrates sandwiching a liquid crystal layer such that liquid crystal molecules are twisted by about 90 degrees, is sandwiched between two polarizing plates. According to the NW mode, two polarizing plates are arranged such that their polarizing axes are orthogonal and become parallel or perpendicular to the major axis of liquid crystal molecules in contact with one substrate.

In this case, when no voltage is applied or a voltage equal to a threshold or less is applied, the liquid crystal display device displays white. When a voltage higher than the threshold is applied, the light transmittance of the liquid crystal display device gradually decreases, and the liquid crystal display device displays black. These display characteristics are obtained because when a voltage is applied to the liquid crystal panel, the liquid crystal molecules are modulated to be aligned in the direction of electric field while untwisting their twist structure.

Even when the molecule orientation is the same, the state of polarization of the transmitted light changes depending on the direction of incidence of light on the liquid crystal panel, so the light transmittance differs in accordance with the direction of incidence. In other words, the liquid crystal panel has view angle dependency. The view angle dependent characteristics of the TN method pose a serious problem, particularly in the image characteristics, in a large-screen liquid crystal display which has been developed widely recent years.

As a means for solving this problem, Japanese Examined Patent Publication No. 63-21907, Japanese Unexamined Patent Publication No. 7-36058, and the like propose so-called transverse electric field method IPS (In-Plane-Switching), with which an electric field is not applied in a direction perpendicular to the substrates, as in the TN liquid crystal display method, but the electric field to be applied to the liquid crystal is set substantially parallel to the substrates, and the direction of liquid crystal molecules is controlled within the substrate surfaces, thus modulating light.

With the IPS-mode liquid crystal display device, even when the user shifts his or her viewpoint, he basically sees only the directions of minor axes of the liquid crystal molecules. Hence, this liquid crystal display device is free from the view angle dependency of the "standing direction" of the liquid crystal, and a wider view angle than in a TN-mode liquid crystal display device and the like can be achieved.

A normally-black IPS liquid crystal display device (shown in FIG. 1) utilizing the TFT characteristics will be described as an example. Normally-black is a display method for a liquid crystal display device, with which the polarizing axes of the polarizing layers are arranged such that the display device displays black when no voltage difference is produced between a pixel electrode 24 for driving the liquid crystal and a common electrode 14 and the liquid crystal is orientated at the initial alignment angle, and such that the display device displays white when a voltage difference is applied between the pixel electrode 24 and common electrode 14 and the liquid crystal is rotated (ideally through 45 degrees) from initial alignment.

The liquid crystal is initially aligned with an inclination of about 15 degrees, as indicated by an alternate long and short dashed line, with respect to the pixel electrode 24 and common electrode 14 which form comb electrodes fitted with each other, and rotates in only a specific direction upon application of a voltage between the pixel electrode 24 and common electrode 14. The absorbing axes of the polarizing plates are aligned with the initial alignment direction of the liquid crystal, and an appropriate retardation $\Delta nd$ (product of a refractive index anisotropy $\Delta n$ of the liquid crystal and the effective thickness $d0$ of the liquid crystal layer) is set, so the display device can perform colorless white display and black display.

Display nonuniformity called residual image often occurs in an active matrix liquid crystal display device, in which when the display device displays characters or figures, even after they are deleted, their images stay to remain on the screen for some time. In particular, in the IPS mode, residual image tends to occur very often when compared to a display method in which the direction of the electric field to be applied to the liquid crystal is set substantially perpendicular to the substrate interfaces.

As a method of solving this residual image issue, for example, according to Japanese Unexamined Patent Publication No. 7-159786, if certain conditions for the physical properties of the liquid crystal, alignment film, and insulating film are met, a time required until a display part and non-display part can be discerned after displaying the same pattern for 30 min and erasing the displayed pattern can be set to 5 min or less.

However, according to the invention described in Japanese Unexamined Patent Publication No. 7-159786, when the resistivity of the liquid crystal is sufficiently decreased, although the residual image phenomenon is decreased, if a fixed pattern is displayed for a long period of time, a residual image sometimes occurs.

Conventionally, various factors were attributed to the residual image which occurs in the IPS mode. For example, due to the necessary arrangement, electrode interconnections are formed on only the active substrate unit, and not on the opposite color filter unit. Therefore, an electric field may enter a light-shielding layer for shielding the color layer in the color filter, the electrode interconnections on the active substrate, and TFT elements, thus causing a residual image.

The operation of the TFT will be described. A TFT element serves as a switch which is turned on/off by the voltage applied to the gate electrode. When a sufficiently negative potential (approximately about −10 V although it may differ depending on the arrangement of the TFT element) is applied to the gate electrode, movement of the charges in a-Si decreases, so a signal voltage from the drain electrode is not transmitted to the source electrode. Thus, the signal voltage is not applied to a pixel electrode electrically connected to the source electrode, either.

When a sufficiently positive potential (approximately about +20 V although it may differ depending on the arrangement of the TFT element) is applied to the gate electrode, movement of the charges in a-Si increases, so a signal voltage from the drain electrode is transmitted through the source electrode and applied to the pixel electrode. When a monochromatic fixed pattern is displayed on the IPS liquid crystal display device, the potential difference between the drain and source electrodes of a TFT element in a pixel that displays white differs from the potential difference between the drain and source electrodes of a TFT element in a pixel that displays black.

Why residual image occurs will be described in more detail. For example, if the TFT element has the characteristics as shown in FIG. 2, a residual image that a part that has displayed white becomes brighter is observed. The ON current of the TFT that has displayed white is almost equal to that of a part that has displayed black. Since only the OFF current decreases, the voltage written in the liquid crystal is discharged by an OFF current lower than that at the part that has displayed white. Therefore, the part that has displayed white becomes undesirably brighter than the part that has displayed black, because the effectively large applied voltage remains in the liquid crystal.

A phenomenon opposite to this also happens. When the ON current for the part that has displayed white decreases as shown in FIG. 3, a phenomenon that the part that has displayed white is displayed darker occurs.

In the conventional IPS liquid crystal display device, a light-shielding layer is formed on a color filter unit side. Light entering a region (non-open portion) other than the pixel electrodes and common electrode which form comb teeth is shielded by the light-shielding layer. In the non-open region, the state of alignment of the liquid crystal is the same as that of the open region, so display is not adversely affected.

For this reason, when white is displayed, the liquid crystal on the TFT element of this pixel is rotated from the initial alignment angle. On the other hand, a liquid crystal on the TFT element of a pixel that has displayed black is not much rotated since the electric field between the drain electrode and source electrode is small.

When fixed monochromatic pattern is continuously displayed for a long period of time, the state of the liquid crystal on the TFT element changes, and is fixed. It takes a certain period of time until the changed TFT characteristics are restored. Therefore, the liquid crystal alignment on the TFT element of the pixel that has displayed black differs from that on the TFT element of the pixel that has displayed white, and the electric field enters amorphous silicon differently. This causes a difference in the TFT characteristics. Then, for example, when half-tone solid display is performed, a pattern which is the same as the previously displayed pattern is visually recognized, that is, the so-called residual image phenomenon occurs.

The present inventors found that residual image which was not conventionally solved in the liquid crystal display device was related to a change in TFT characteristics of each pixel. More specifically, according to the findings of the present inventors, when the liquid crystal display device displays a fixed pattern, a change occurs in the characteristics of the TFT element of a pixel which displays white and of the TFT element of a pixel which displays black, thus causing a residual image.

The alignment state of the liquid crystal molecules on the TFT element gradually shifts from the initial state due to the electric field generated between the drain electrode and source electrode. Due to this shift, the electric field enters the amorphous silicon portion of the TFT element differently in the case of white display and in the case of black display. As a result, the subsequent display state changes.

SUMMARY OF THE INVENTION

The present invention has been made in view of the above situation of the prior art, and has as its object to provide an active matrix liquid crystal display device in which even if the TFT element operates, the orientation of the liquid crystal on the TFT element does not change from the initial alignment angle. Therefore, a liquid crystal display device is provided in which the characteristics of the TFT element do not change during display, and even after a fixed pattern is kept displayed for a long period of time, no residual image phenomenon occurs.

Arrangements with which the liquid crystal alignment on the TFT element portion is not changed by the electric field generated between the drain electrode and source electrode will be practically described.

(1) The shapes of the drain electrode and source electrode are determined such that the direction of the electric field generated between the drain electrode and source electrode coincides with the rubbing direction. For example, the drain electrode and source electrode are formed such that their opposing edges are perpendicular to the rubbing direction. Also, the shape of amorphous silicon may be inclined to match the rubbing direction.

(2) The rubbing direction in the display region and the liquid crystal alignment on the TFT element are differed from each other, and the direction of the electric field generated between the drain electrode and source electrode and the rubbing direction are set to coincide with each other. This is achieved by, e.g., performing mask rubbing on the TFT element portion (the first and third embodiments to be described later).

(3) Rubbing is performed parallel to the longitudinal direction of the comb teeth, so the liquid crystal alignment on the TFT element coincides with the direction of the electric field between the drain electrode and source electrode (the second embodiment to be described later).

(4) The liquid crystal is rubbed by using an alignment film which can be imparted with an alignment function upon being irradiated with light (the fifth embodiment to be described later).

(5) Partial rubbing is performed by using an alignment film which can be imparted with an alignment function upon being irradiated with light (the sixth embodiment to be described later).

(6) A liquid crystal with a negative dielectric constant anisotropy is used. In this case, the liquid crystal must be imparted with initial alignment in a direction perpendicular to the direction of the electric field generated between the drain electrode and source electrode (the seventh embodiment to be described later).

(7) The drain electrode, the source electrode, and amorphous silicon are formed inclined to be parallel to the rubbing direction. (the eighth embodiment to be described later).

(8) The electric field generated by the source electrode and drain electrode in the TFT element is set parallel to the rubbing direction, and a pixel electrode and common electrode within at least the display region are formed parallel to the rubbing direction (the ninth embodiment to be described later).

(9) The electric field generated by the source electrode and drain electrode in the TFT element is set parallel to the rubbing direction, and a pixel electrode and common electrode at least within the display region are formed to have an L shape (the 10th and 11th embodiments to be described later).

In the liquid crystal display devices with the above arrangements according to the present invention, the liquid crystal alignment on the TFT element is always constant and does not change in accordance with the state of liquid crystal display. Thus, occurrence of the residual image phenomenon accompanying a change in TFT characteristics can be suppressed, so a high-quality active matrix liquid crystal display device can be provided.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described with reference to the accompanying drawings.

Figure 1:
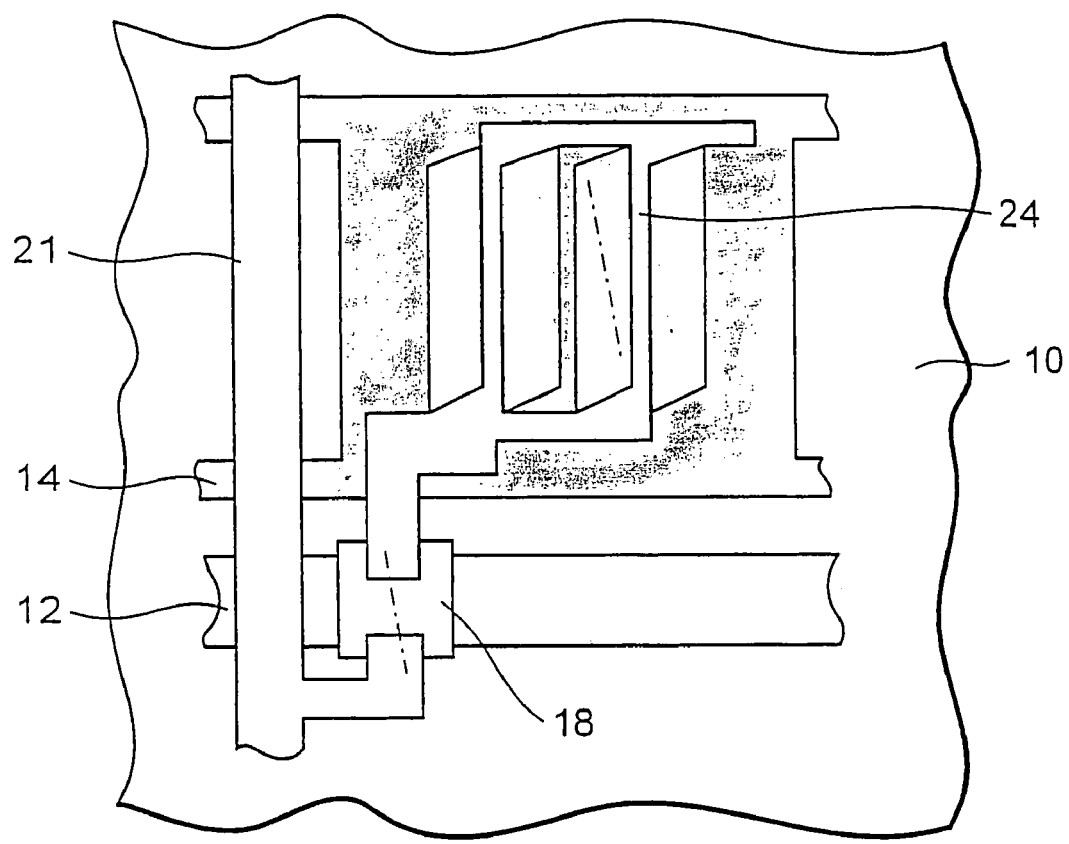
FIG. 1 is a plan view showing an active element substrate unit in a conventional active matrix liquid crystal display device.
Figure 2:
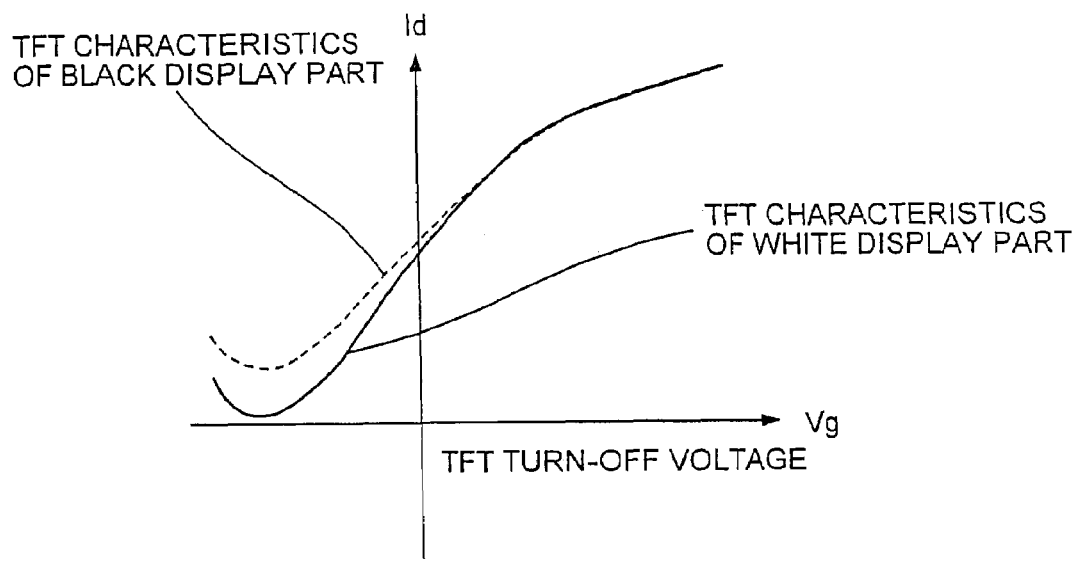
FIG. 2 is a graph of TFT characteristics that change such that the OFF voltage increases.
Figure 3:
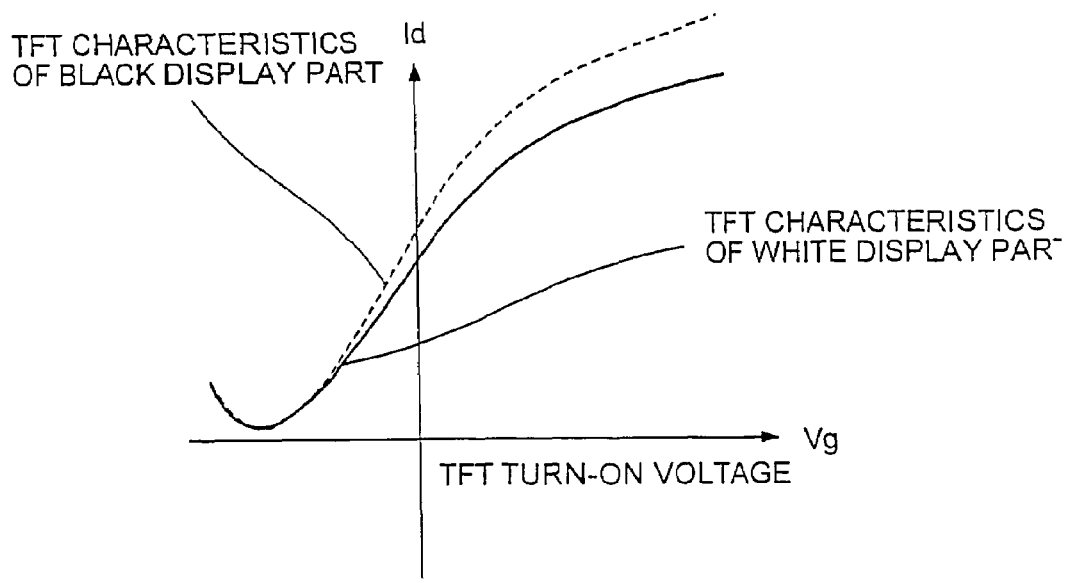
FIG. 3 is a graph of TFT characteristics that change such that the ON voltage increases.
Figure 4:
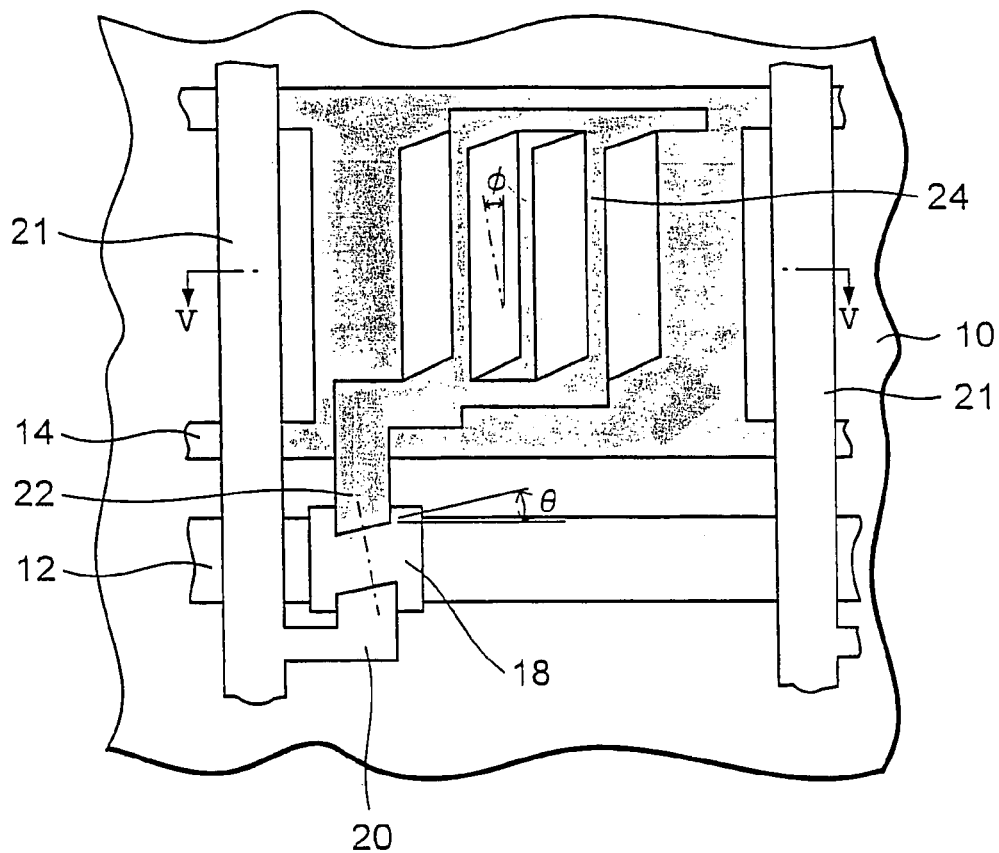
FIG. 4 is a plan view showing an active element substrate unit in an active matrix liquid crystal display device according to the first embodiment of the present invention.
Figure 5:
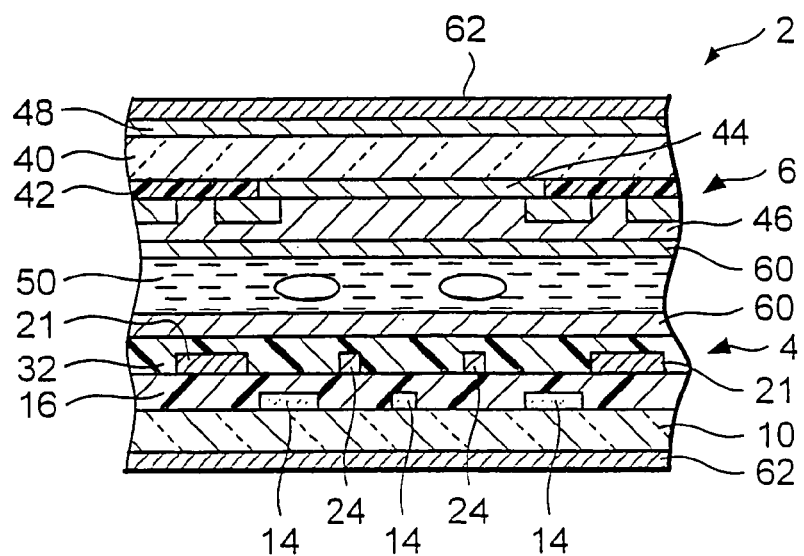
FIG. 5 is a sectional view taken along the line V-V of FIG. 4.

FIGS. 4 and 5 show the first embodiment of the present invention. FIG. 4 is a plan view, and FIG. 5 is a sectional view taken along the line V-V of FIG. 4.

Note that materials and numerals in the first embodiment are merely examples, and that the present invention is not limited by the following description.

As shown in FIG. 5, a liquid crystal panel 2 is comprised of an active element substrate unit 4, color filter unit 6, and liquid crystal.

The active element substrate unit 4 will be described first.

Cr is sputtered to about 1,000 Å (10,000 nm) at a predetermined region on a first glass substrate (TFT substrate) 10, and is patterned to form a scanning signal line 12 and common electrode 14. Then, a silicon nitride film and silicon oxide film as insulators are formed on the glass substrate 10 by CVD to a total of about 5,000 Å so as to cover the scanning signal line 12 and common electrode 14, thus forming a gate insulating film 16.

An a-Si layer and n$^+$ a-Si layer are formed by CVD in a predetermined region to about 3,000 Å and 500 Å, respectively, and are patterned to form island-like amorphous silicon 18.

Cr is sputtered to about 1,000 Å on the gate insulating film 16 and island-like amorphous silicon 18, and is patterned to form a drain electrode 20, data line 21, source electrode 22, and pixel electrode 24. Thus, the island-like amorphous silicon 18, drain electrode 20, and source electrode 22 make up a TFT element.

As shown in FIG. 4, the drain electrode 20 and source electrode 22 are formed such that their opposing edges are inclined by an angle θ, and an initial alignment angle φ formed by rubbing (to be described below) and the angle θ coincide with each other. The initial alignment angle φ and angle θ are angles measured with reference to the longitudinal directions of the pixel electrode 24 and common electrode 14 (also called a comb electrode).

SiN as an insulator is formed on the entire region on the gate insulating film 16 to about 3,000 Å by CVD to form a passivation film 32. The passivation film 32 and gate insulating film 16 are etched in a predetermined region to form a hole communicating with the scanning signal line 12. This hole is filled with Cr or the like to form a contact (not shown). The unit formed in this manner is called the active element substrate unit 4. Note that the widths of the pixel electrode 24 and common electrode 14 are set to 4.5 μm and that the distance between the pixel electrode 24 and common electrode 14 is set to 10 μm.

The color filter unit 6 is formed by forming a light-shielding layer 42, color layer 44, and planarized film 46 into a predetermined pattern in a predetermined region on the inner surface of a second glass substrate (counter substrate) 40. A transparent conductive film 48 made of ITO or the like is formed on the lower surface of the second glass substrate 40 by sputtering in order to prevent display nonuniformity which is caused by charge-up when the operator touches the liquid crystal panel with his hand.

An alignment film 60 is formed on the surface of each of the active element substrate unit 4 and color filter unit 6 by offset printing or the like, and is subjected to rubbing by the rubbing method such that the initial alignment angle becomes φ. In the drawings, the initial alignment direction is indicated by an alternate long and short dashed line.

An inner-cell spacer or the like (not shown) is placed between the active element substrate unit 4 and color filter unit 6 to form a predetermined gap, and a nematic liquid crystal 50 is sealed in it with a sealing agent (not shown) and a hole closing material (not shown), thus forming the liquid crystal panel 2. Hence, the liquid crystal molecules of the nematic liquid crystal 50 are initially aligned parallel such that they are inclined with respect to the pixel electrode 24 and common electrode 14 at the angle φ (15 degrees; the angle need not be 15 degrees but may take other values).

As the liquid crystal material, a nematic liquid crystal with a positive dielectric constant anisotropy Δε of 8.0 (589 nm, 20 degrees of Celsius thermometer), a refractive index anisotropy )n of 0.075, and a liquid crystal resistivity of $1.0 \times 10^{12}$ Ω·cm is used. The thickness of the liquid crystal layer (cell gap) is set to 4.0 μm.

Polarizing plates 62 are arranged on the upper and lower surfaces of the liquid crystal panel 2. Thus, the state of alignment of the nematic liquid crystal 50 is changed upon application of an external signal voltage, to control the strength of light transmitted through the liquid crystal panel 2, so that the liquid crystal display device (not shown) performs gradation display.

When no potential difference is applied between the pixel electrode 24 and common electrode 14, the liquid crystal display device displays black. When a potential difference is applied between the pixel electrode 24 and common electrode 14 to form an electric field almost parallel to the glass substrate 10, and the liquid crystal is rotated through almost 45 degrees from the initial alignment angle so the strength of the transmitted light becomes the maximum, the liquid crystal display device displays white (normally-black method).

The liquid crystal panel 2 obtained in this manner was built as a liquid crystal display device in a driving unit (not shown), and was subjected to a residual image test. As shown in FIG. 4, the drain electrode 20 and source electrode 22 of the liquid crystal panel 2 are formed such that their opposing edges are inclined at the angle θ, and the initial alignment angle φ and the angle θ coincide with each other. Even when an electric field is generated between the drain electrode 20 and source electrode 22, the liquid crystal molecules do not rotate. Therefore, the dielectric constant and the like between the drain electrode 20 and source electrode 22 did not differ between white display and black display, and no residual image occurred at all. Also, φ=θ need not always be satisfied. In this case, the closer the values of φ and θ, the more residual image can be prevented.

The second embodiment will be described with reference to FIG. 6.

In this embodiment, an active element substrate unit 4 is formed in the following manner. A description on the same steps, members, and the like as those in the first embodiment will be omitted.

Figure 6:
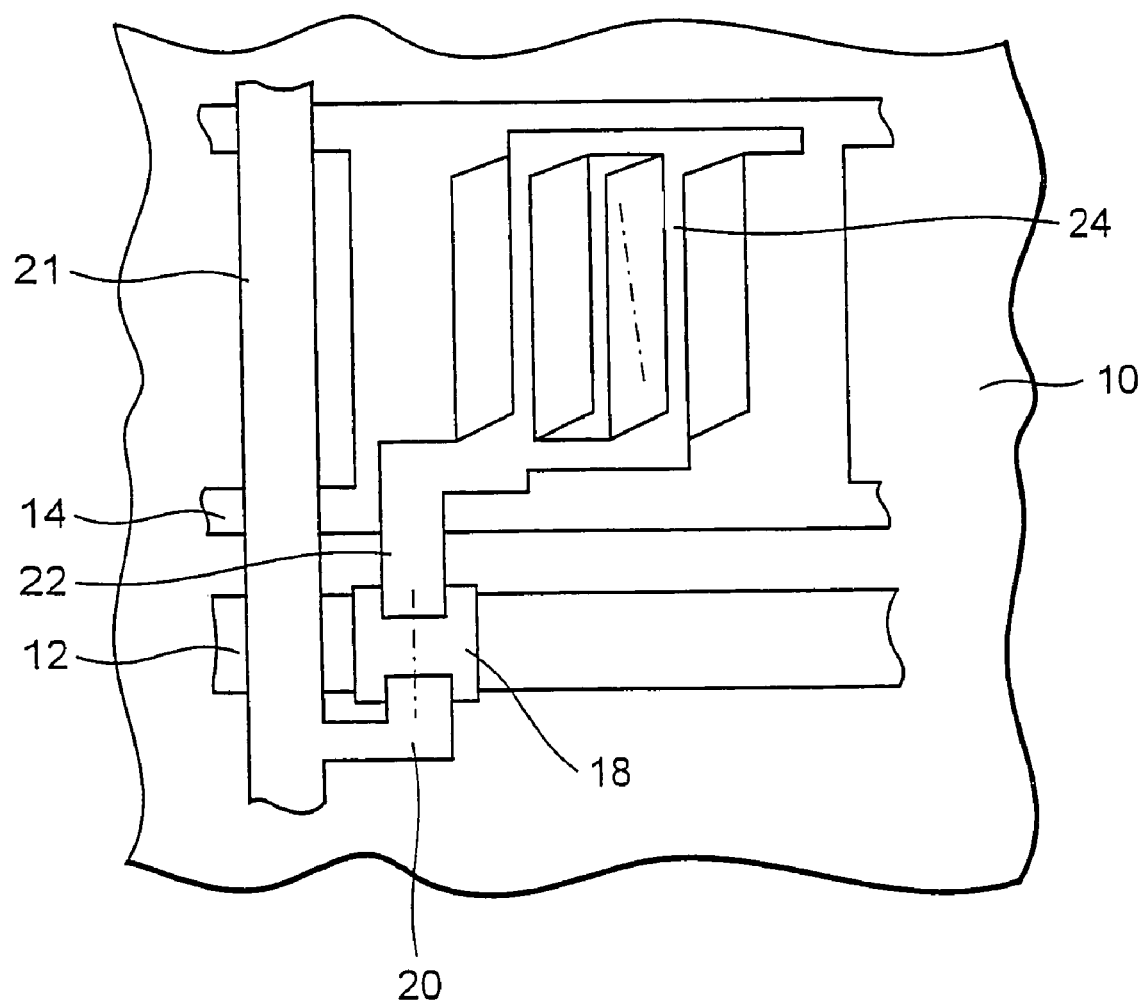
FIG. 6 is a plan view showing an active element substrate unit in an active matrix liquid crystal display device according to the second embodiment of the present invention.

In the active element substrate unit 4, as shown in FIG. 6, the opposing edges of a drain electrode 20 and source electrode 22 form the right angles with the longitudinal direction of the comb electrode formed of a pixel electrode 24 and common electrode 14, and an alignment film 60 is rubbed to have an initial alignment angle φ. The drain electrode 20 and source electrode 22 are subjected to rubbing such that they are parallel to the longitudinal direction of the comb electrode.

Regarding this, liquid crystal molecules are aligned parallel by rubbing such that they are inclined at φ (15 degrees) with respect to the longitudinal direction of the comb electrode. After that, a negative photosensitive resist is printed by a spin coater, and those portions of the resist which are on the drain electrode 20 and source electrode 22 are removed by photolithography. In this state, rubbing is performed, and the liquid crystal panel 2 is formed such that the liquid crystal molecules on the drain electrode 20 and source electrode 22 are aligned parallel (θ=0) to the longitudinal direction of the comb electrode.

A display device formed of the liquid crystal panel 2 obtained in this manner was subjected to a residual image test. On the drain electrode 20 and source electrode 22, the direction of the electric field and the liquid crystal alignment coincide, in the same manner as in the first embodiment. The liquid crystal molecules are not accordingly rotated by the electric field. An apparent residual image suppression effect was confirmed.

The third embodiment will be described with reference to FIG. 7.

Figure 7:
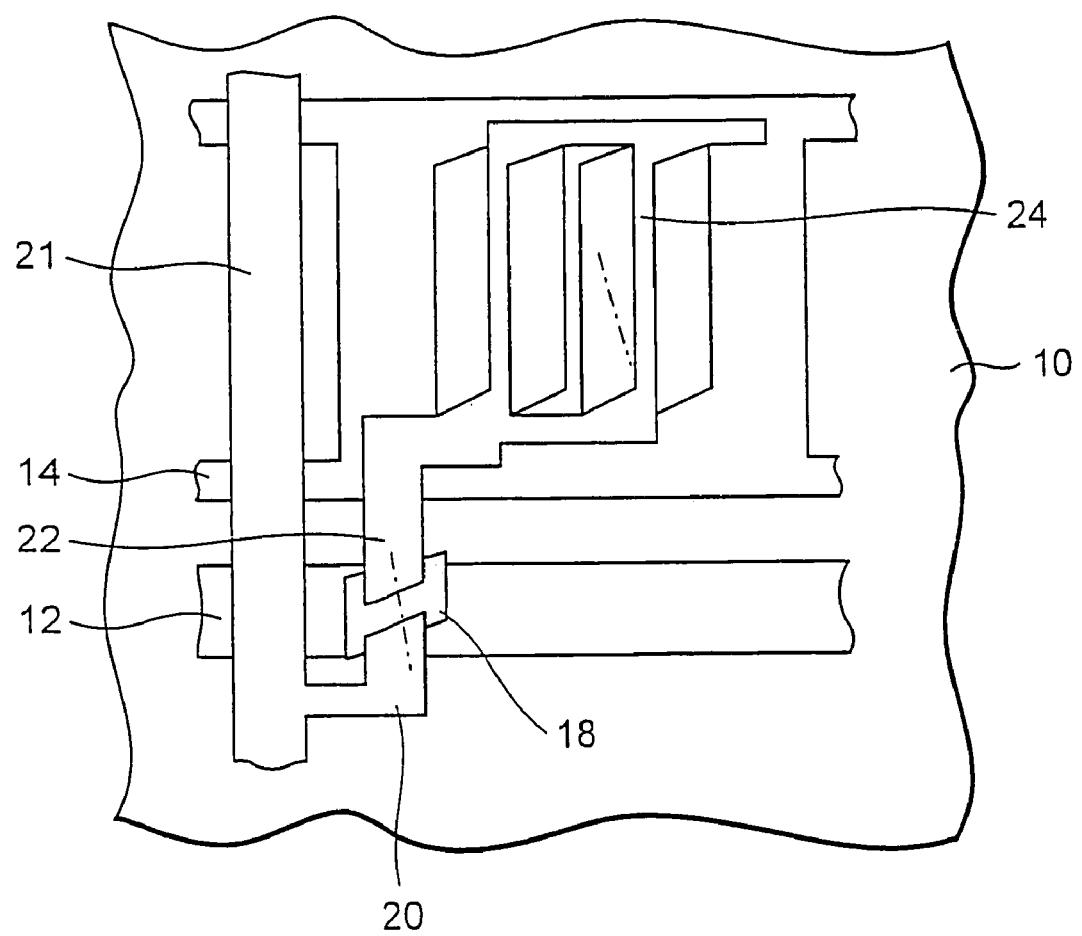
FIG. 7 is a plan view showing an active element substrate unit in an active matrix liquid crystal display device according to the third embodiment of the present invention.

In this embodiment, regarding the opposing edges of a drain electrode 20 and source electrode 22, as shown in FIG. 7, an initial alignment angle φ obtained by rubbing and an inclination angle θ of the drain electrode and source electrode are set to coincide with each other, in the same manner as in the first embodiment, and island-like amorphous silicon 18 is also inclined to match the inclination angle θ. Except for these respects, the third embodiment is identical with the first embodiment. Residual image can be prevented more effectively also in this manner.

The fourth embodiment will be described with reference to FIG. 8.

Figure 8:
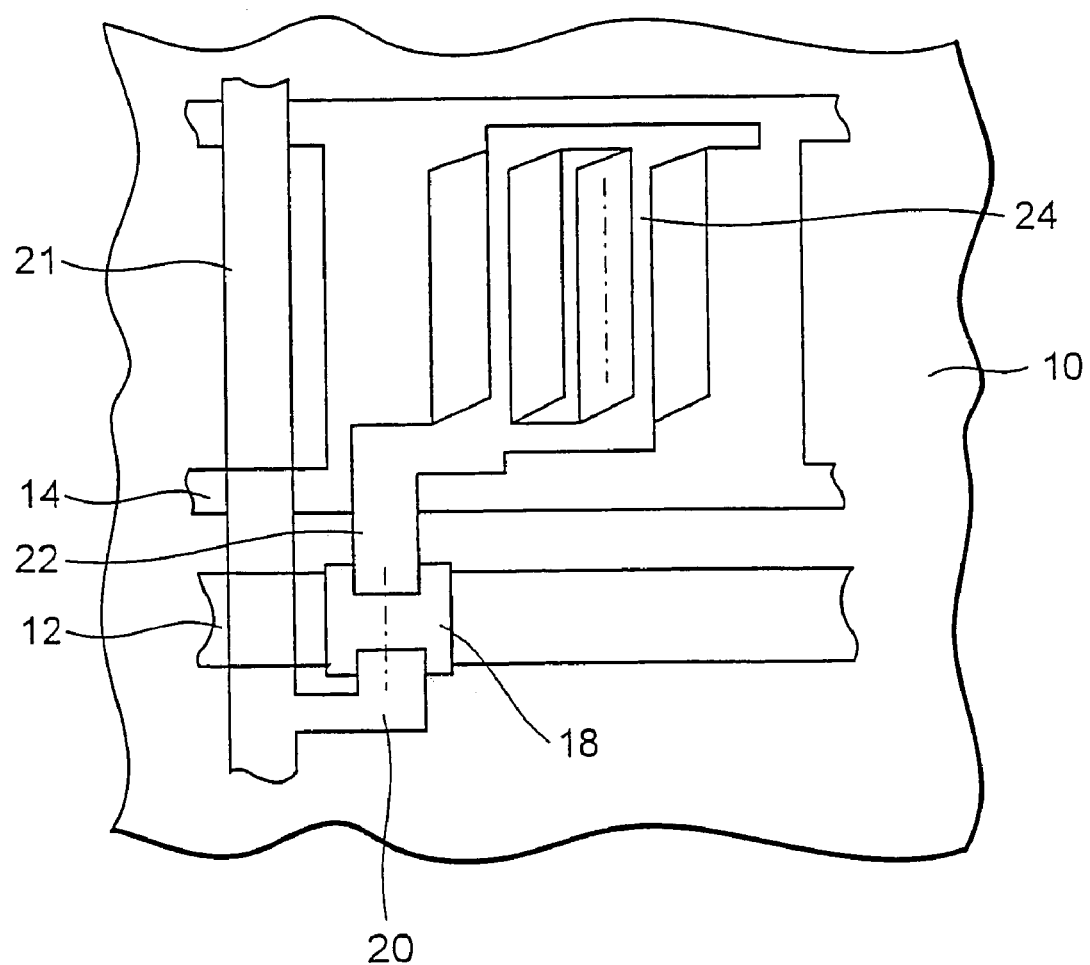
FIG. 8 is a plan view showing an active element substrate unit in an active matrix liquid crystal display device according to the fourth embodiment of the present invention.

In this embodiment, as shown in FIG. 8, the opposing edges of a drain electrode 20 and source electrode 22 are set perpendicular to the longitudinal direction of the comb electrode, and the alignment direction of entire rubbing is set parallel to the longitudinal direction of the comb electrode. Then, no rotation force is applied to the liquid crystal molecules on the drain electrode 20 and source electrode 22 by the electric field generated between the drain electrode 20 and source electrode 22, so residual image does not occur. The open portion, i.e., the comb electrode, applies a predetermined rotation force to the liquid crystal, so arbitrary display is performed.

The fifth embodiment will be described.

In this embodiment, as alignment films 60, those to which an aligning capability is imparted by irradiation with light (ultraviolet rays, a laser beam, or the like) are used. These alignment films may set entire alignment as described above, or the alignment direction may differ from portion to portion.

For example, an alignment film on a drain electrode 20 and source electrode 22 (on island-like amorphous silicon 18) is aligned by light, using a photomask, such that they are perpendicular to the opposing edges of the drain electrode 20 and source electrode 22, i.e., such that it is parallel to the longitudinal direction of the comb electrode. At other portions, the alignment film is aligned by using another photomask such that they are inclined at φ (15 degrees) with respect to the longitudinal direction of the comb electrode. A liquid crystal panel is formed in this manner.

When a display device formed of a liquid crystal panel 2 obtained in this manner is subjected to a residual image test, an apparent residual image suppression effect was confirmed.

According to the sixth embodiment, as alignment films 60, those that can be imparted with an alignment capability upon irradiation with light are employed, in the same manner as in the fifth embodiment, and are aligned by light such that the entire alignment direction is parallel to the longitudinal direction of the comb electrode. More specifically, the alignment films 60, respectively formed on the surfaces of an active element substrate unit 4 and color filter unit 6 by offset printing or the like, are irradiated with light in a predetermined direction, so as to align liquid crystal molecules such that they are parallel to the longitudinal direction of the comb electrode, thus forming a liquid crystal panel. Alternatively, the liquid crystal molecules may be aligned in other directions by light or the like.

When a display device formed of the liquid crystal panel obtained in this manner was subjected to a residual image test, an apparent residual image suppression effect was confirmed.

The seventh embodiment will be described with reference to FIG. 9.

Figure 9:
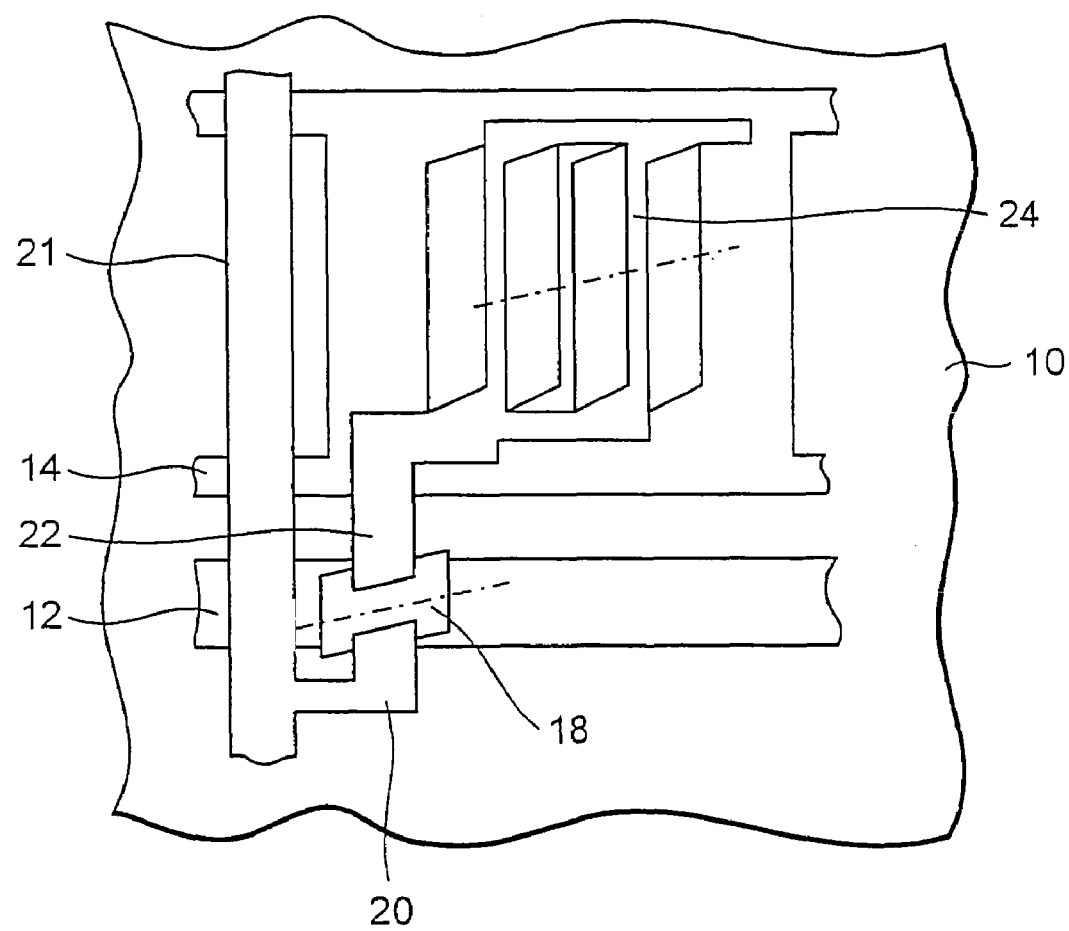
FIG. 9 is a plan view showing an active element substrate unit in an active matrix liquid crystal display device according to the seventh embodiment of the present invention.

In this embodiment, a drain electrode 20, source electrode 22, and island-like amorphous silicon 18 are inclined as shown in FIG. 9, so that they match an inclination angle θ, in the same manner as in the third embodiment. Alignment films 60 for an active element substrate unit 4 and color filter unit 6 are subjected to rubbing by the rubbing method such that they are inclined at an angle φ (15 degrees) with respect to the widthwide direction of the comb electrode, as shown in FIG. 9, and the liquid crystal molecules are aligned parallel.

A predetermined gap is formed between the active element substrate unit 4 and color filter unit 6 with an inner-cell spacer or the like (not shown), and a nematic liquid crystal 50 is sealed in it with a sealing agent (not shown) and a hole closing material (not shown), thus forming the liquid crystal panel. As the liquid crystal material, a nematic liquid crystal with a negative dielectric constant anisotropy $\Delta\epsilon$ of $-5.0$ (589 nm, 20 degrees of Celsius thermometer), a refractive index anisotropy $\Delta n$ of 0.075, and a liquid crystal resistivity of $1.5 \times 10^{12}$ Ω cm is used.

At the comb electrode portion, the liquid crystal is imparted with a rotation force by the electric field, so it changes display. Regarding the liquid crystal on the drain electrode 20 and source electrode 22, even when a voltage is applied between the drain electrode 20 and source electrode 22, as the dielectric constant anisotropy $\Delta\epsilon$ is negative, the electric field in this direction cannot impart a rotation force. Thus, a residual image does not occur.

The eighth embodiment will be described with reference to FIG. 10.

Figure 10:
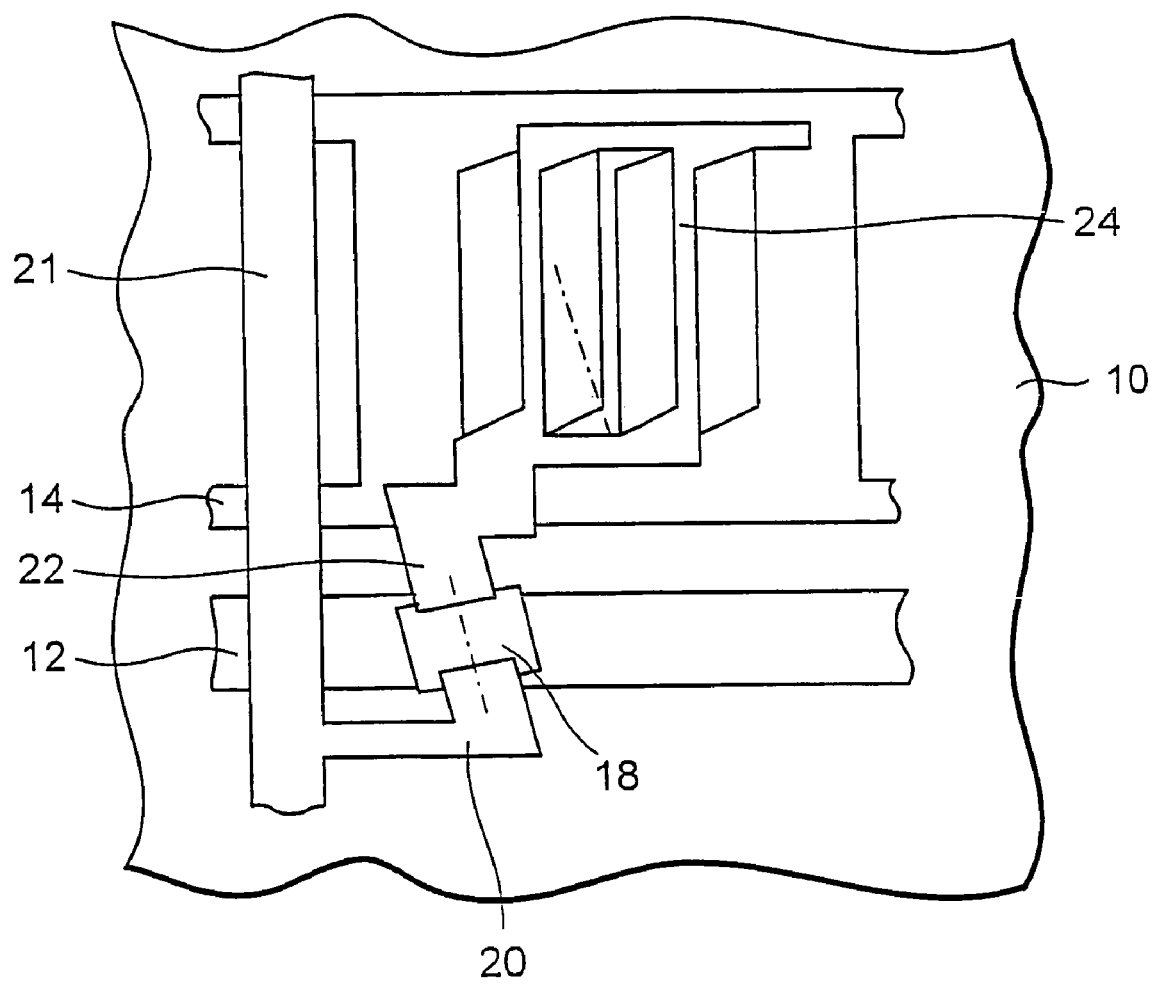
FIG. 10 is a plan view showing an active element substrate unit in an active matrix liquid crystal display device according to the eighth embodiment of the present invention.

In this embodiment, a drain electrode 20, source electrode 22, and island-like amorphous silicon 18 are inclined as shown in FIG. 10, so that they match an inclination angle θ. Regarding the drain electrode 20 and source electrode 22, not only their opposing edges but also those portions of them which are connected to a data line 21 are also set to match the angle θ.

Rubbing is performed with a uniform angle of φ (φ=θ) entirely.

A liquid crystal panel 2 obtained in this manner was built as a liquid crystal display apparatus into a driving unit, and was subjected to a proper residual image test for a long period of time. No residual image occurred at all.

Figure 11:
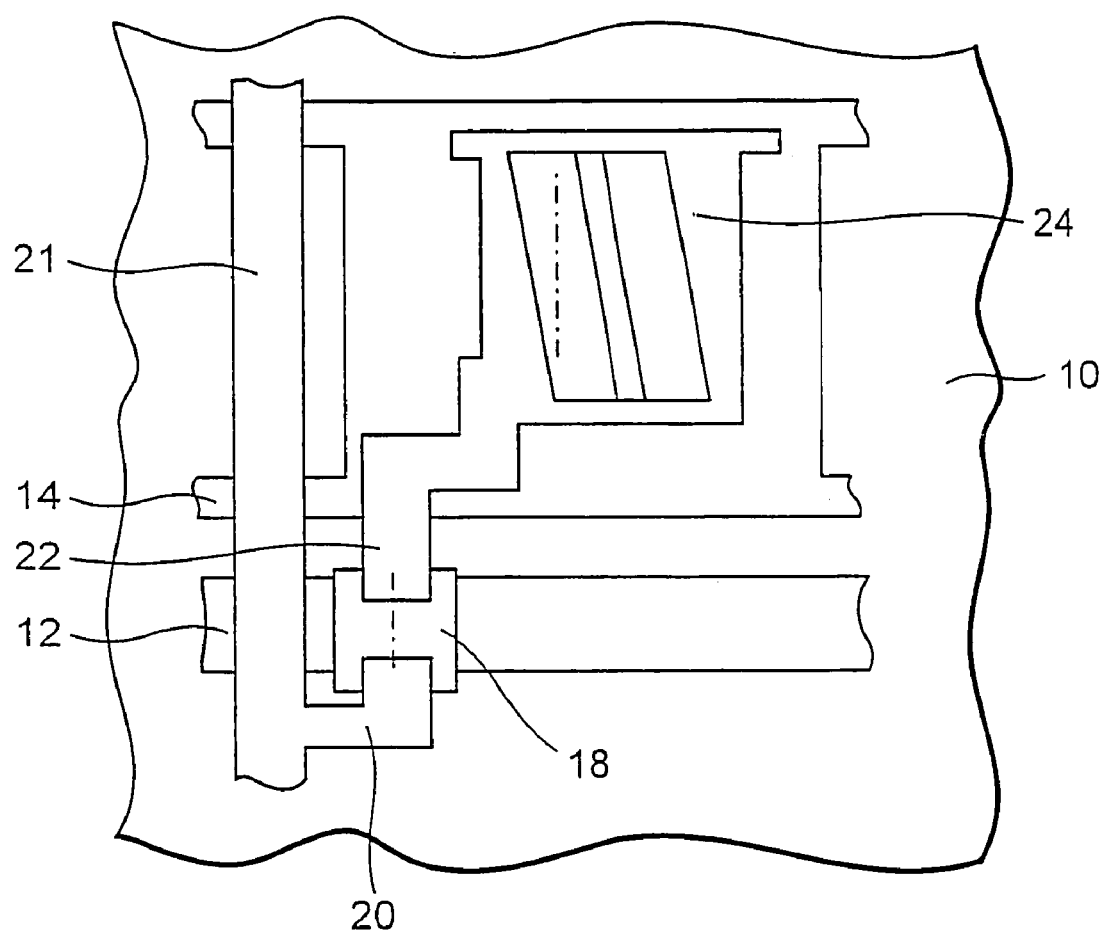
FIG. 11 is a plan view showing an active element substrate unit in an active matrix liquid crystal display device according to the ninth embodiment of the present invention.

The ninth embodiment will be described with reference to FIG. 11.

In this embodiment, the orientation of the comb electrode is inclined. More specifically, rubbing is performed parallel to a data line 21 and the like. Regarding a drain electrode 20 and source electrode 22, their opposing edges are perpendicular to the rubbing direction.

In the above arrangement, when an angle N is set between the direction of the electric field of the comb electrode and the initial alignment direction of the liquid crystal molecules, no problem occurs when changing display. As the direction of the liquid crystal on the drain electrode 20 and source electrode 22 coincides with the direction of the electric field between the drain electrode 20 and source electrode 22, no rotation force is imparted to the liquid crystal. Therefore, a residual image can be prevented.

A liquid crystal panel 2 obtained in this manner was built as a liquid crystal display apparatus into a driving unit, and was subjected to a proper residual image test for a long period of time. No residual image occurred at all.

Figure 12:
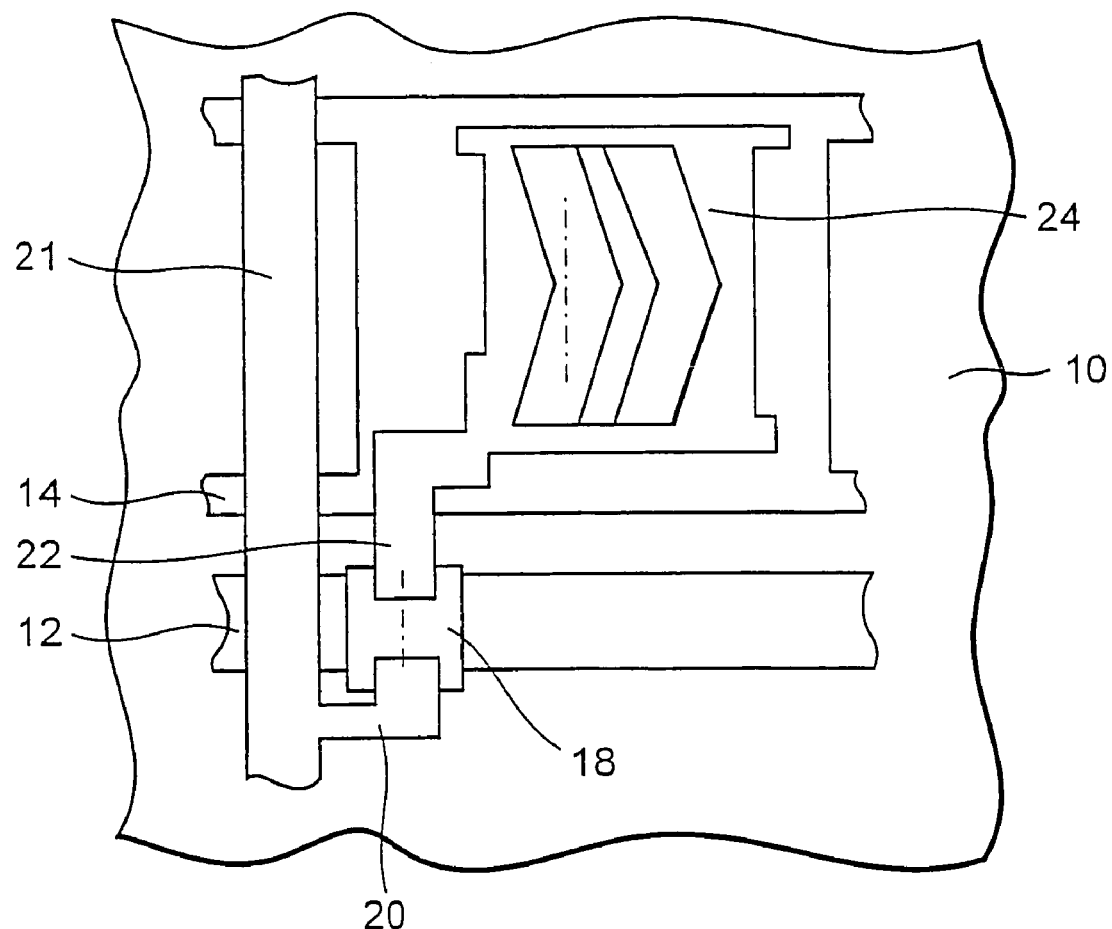
FIG. 12 is a plan view showing an active element substrate unit in an active matrix liquid crystal display device according to the 10th embodiment of the present invention.

The 10th embodiment will be described with reference to FIG. 12.

In this embodiment, the comb electrode is formed to have an L shape. The rubbing direction is identical with that of the ninth embodiment, and is parallel to a data line 21 and the like.

In the above embodiment, at the comb electrode portion, the liquid crystal molecules are rotated in the respective directions by the electric field, so display is changed. As the direction of the liquid crystal on a drain electrode 20 and source electrode 22 coincides with the direction of the electric field between the drain electrode 20 and source electrode 22, no rotation force is imparted to the liquid crystal. Therefore, a residual image can be prevented.

When the comb electrode is formed with this shape, a portion where the liquid crystal molecules are rotated clockwise by the electric field of the comb electrode and a portion where the liquid crystal molecules are rotated counterclockwise by the electric field of the comb electrode are formed. Since the liquid crystal molecules are rotated in two directions, orientations of the liquid crystal molecules at the open portion can be dispersed, so that the visual easiness of the screen can be improved. The L shape of the comb electrode is symmetric with respect to the rubbing direction. Alternatively, the orientations of the liquid crystals may be appropriately dispersed, or may be biased in any particular direction for the purpose of, e.g., improving the visual easiness of the screen.

When a liquid crystal panel 2 obtained in this manner was built as a liquid crystal display device into a driving unit, the rotational directions of the liquid crystal molecules compensated on the right and left sides of the L-shaped electrode. Thus, the visual angle was widened more than in either one of the above embodiments. When a residual image test was performed over a long period of time, no residual image occurred at all.

Figure 13:
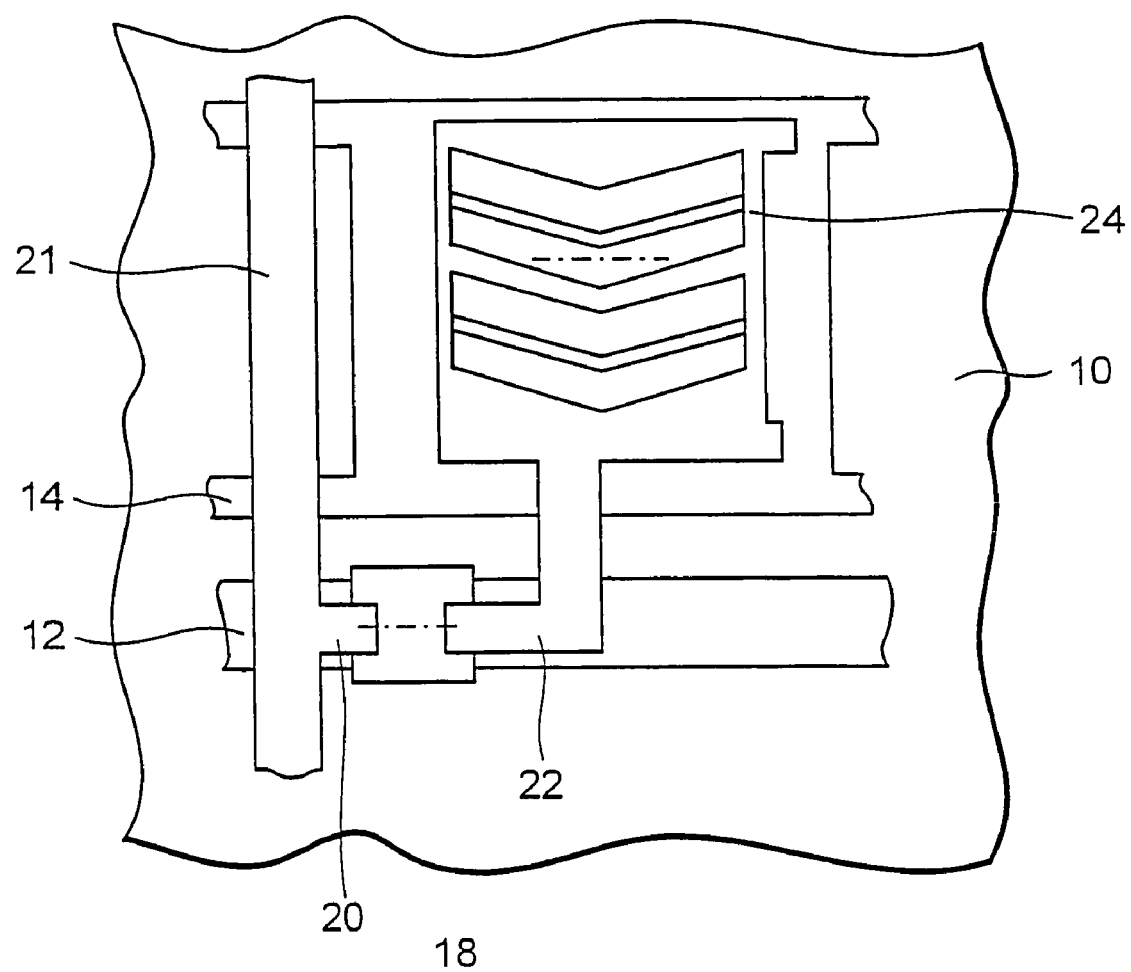
FIG. 13 is a plan view showing an active element substrate unit in an active matrix liquid crystal display device according to the 11th embodiment of the present invention.

FIG. 13 shows the 11th embodiment in which a comb electrode, a drain electrode 20, and a source electrode 22 identical with those of the above ninth embodiment are rotated through 90 degrees. When the comb electrode and the like are formed in this manner, a display device in which residual image is suppressed and with a wide visual angle can be provided.

As has been described above, from the first to the 11th embodiments, the liquid crystal alignment on the TFT element is always constant. Therefore, residual image accompanying a change in TFT characteristics can be suppressed. The residual image suppression effect is particularly apparent in the third and eighth embodiments.

In the first, third, fifth, sixth, seventh, eighth, ninth, 10th, and 11th embodiments, the liquid crystal panel can be manufactured with the same process as that for a panel with the conventional structure. In the fourth embodiment, the driving voltage to be applied to the liquid crystal can be decreased.

In the fifth and sixth embodiments, since powder dust produced by rubbing can be eliminated, the yield in the panel manufacture can be improved.

In the 10th and 11th embodiments, since the comb electrode is formed into an L shape, the rotational direction of the liquid crystal differs between the right and left sides of the electrode or between the upper and lower sides of the electrode. Thus, coloration that occurs when the liquid crystal panel is seen obliquely can be prevented, and the view angle is widened.

Figure 14:
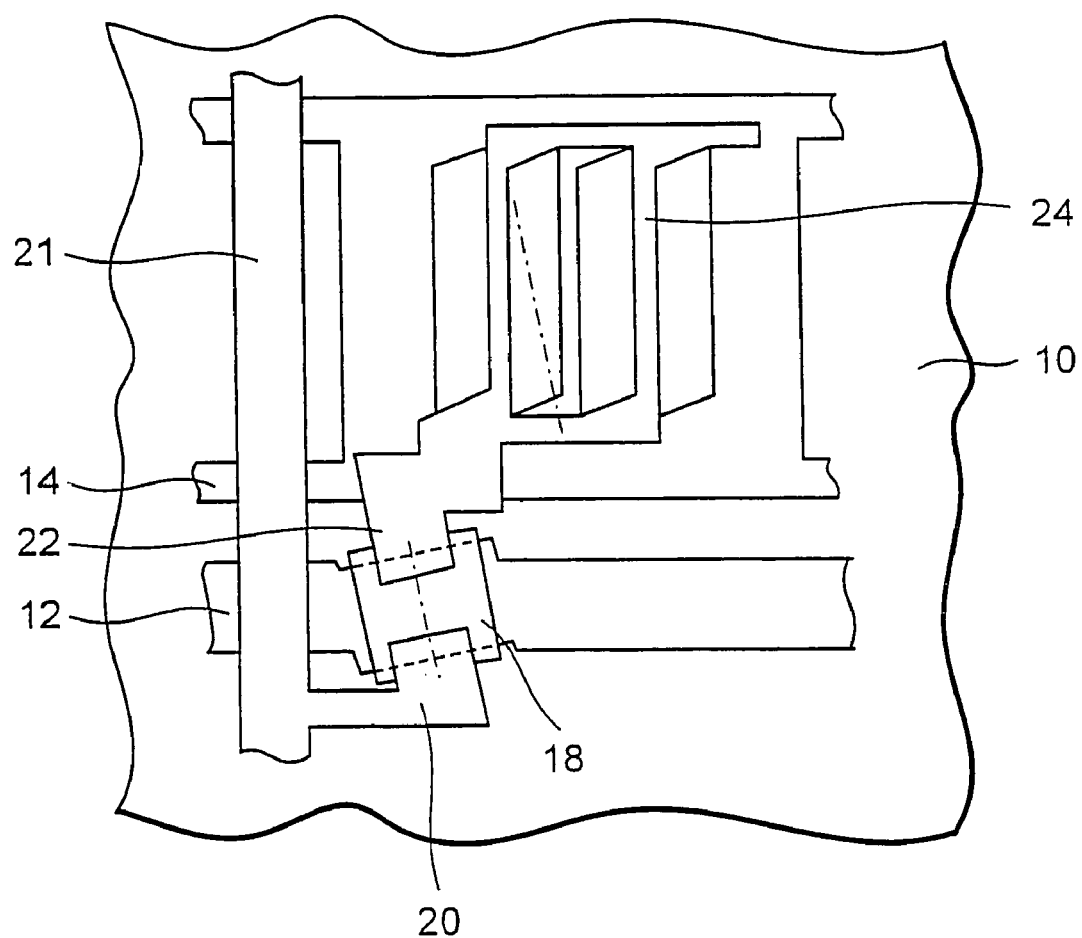
FIG. 14 is a plan view showing a modification to the eighth embodiment shown in FIG. 10.

FIG. 14 shows a modification to the eighth embodiment shown in FIG. 10. In this modification, part of a scanning signal line 12 corresponding to inclined island-like amorphous silicon 18 is inclined to match the inclination of the island-like amorphous silicon 18.

What is claimed is:

1. An active matrix liquid crystal display, comprising:
   a pair of substrates with a liquid crystal layer between said substrates;
   a pixel electrode and a common electrode that each have a V-shape with two legs and that are arranged and adapted to generate an electric field parallel to said substrates in said liquid crystal layer, said liquid crystal layer having a non-zero initial alignment angle relative to each of the legs of the V-shaped electrodes; and
   a thin film transistor having a source electrode and a drain electrode adjacent to a first part of said liquid crystal layer, said source and drain electrodes being arranged and adapted so that an electric field generated between said source and drain electrodes is one of substantially parallel to and perpendicular to the non-zero initial alignment angle, whereby an alignment of the first part of said liquid crystal layer does not change when an electric field is generated between said source and drain electrodes.

* * * * *